United States Patent [19]
Friesner

[11] 3,813,199

[45] May 28, 1974

[54] APPARATUS FOR PRODUCING TRIM STRIP ASSEMBLY

[75] Inventor: Charles E. Friesner, Pemberville, Ohio

[73] Assignee: Industrial Plastic Specialties Company, Chelsea, Mich.

[22] Filed: Sept. 20, 1973

[21] Appl. No.: 398,988

Related U.S. Application Data

[62] Division of Ser. No. 127,168, March 23, 1971, Pat. No. 3,780,152.

[52] U.S. Cl................. 425/113, 156/244, 264/174, 425/133, 425/462
[51] Int. Cl............................................. B29f 3/00
[58] Field of Search .......... 425/113, 133, 114, 461, 425/462, 467, 131; 264/171, 174, 177; 156/244; 164/86, 275

[56] References Cited
UNITED STATES PATENTS
3,143,583  8/1964  Haugwitz....................... 425/113 X
3,551,542  12/1970  Perrone ......................... 264/174 X
3,579,623  5/1971  Thomson et al................. 264/174 X
3,635,620  1/1972  Brown............................... 425/113

Primary Examiner—R. Spencer Annear
Assistant Examiner—Mark Rosenbaum
Attorney, Agent, or Firm—Allen Owen; James D. McNeil

[57] ABSTRACT

Apparatus for producing a trim strip assembly is disclosed. The trim strip includes a thermoplastic base member, a superimposed strip, and a plastic top coating. The superimposed strip may be of plastic, metal or foil. The apparatus includes extruders and a die having three passageways. A first passageway receives the extruded base member, a second passageway intersects the first passageway and receives the superimposed strip, and a third passageway intersects the second passageway a predetermined distance from the intersection of the first and second passageways.

16 Claims, 6 Drawing Figures

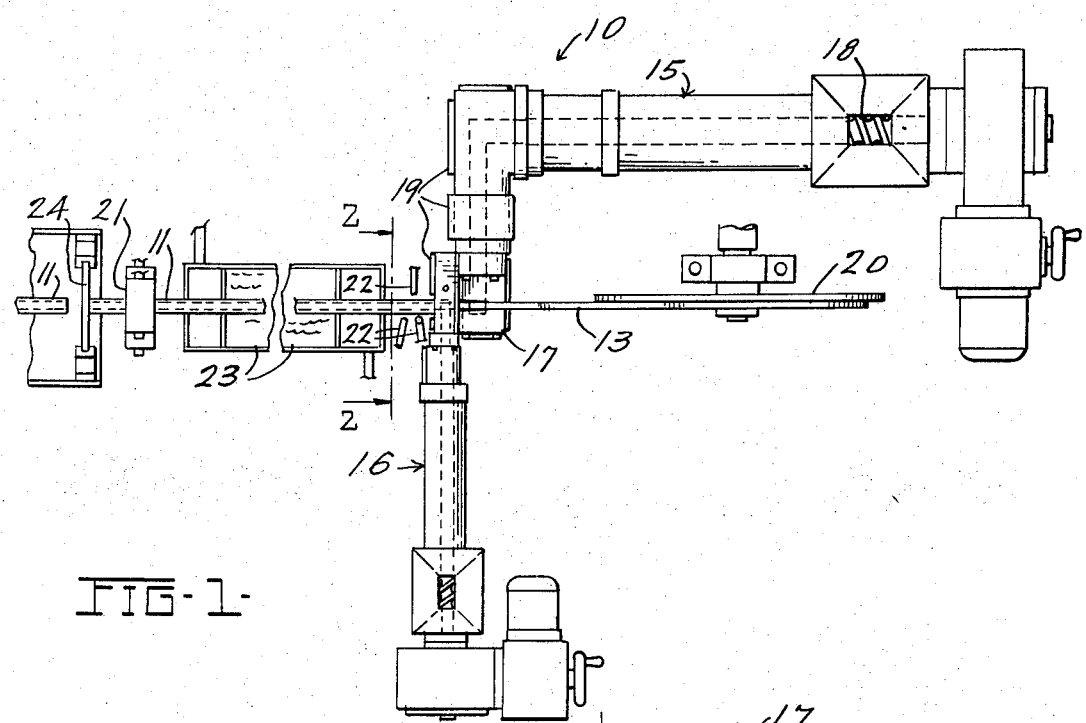
FIG-1-
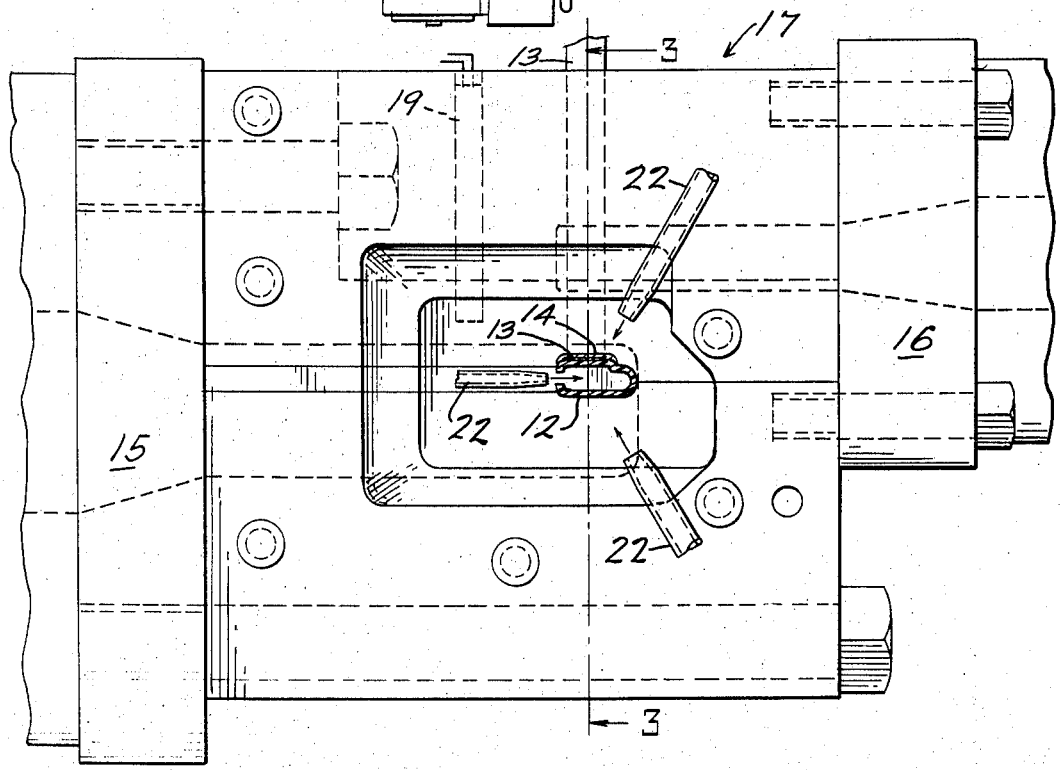
FIG-2-

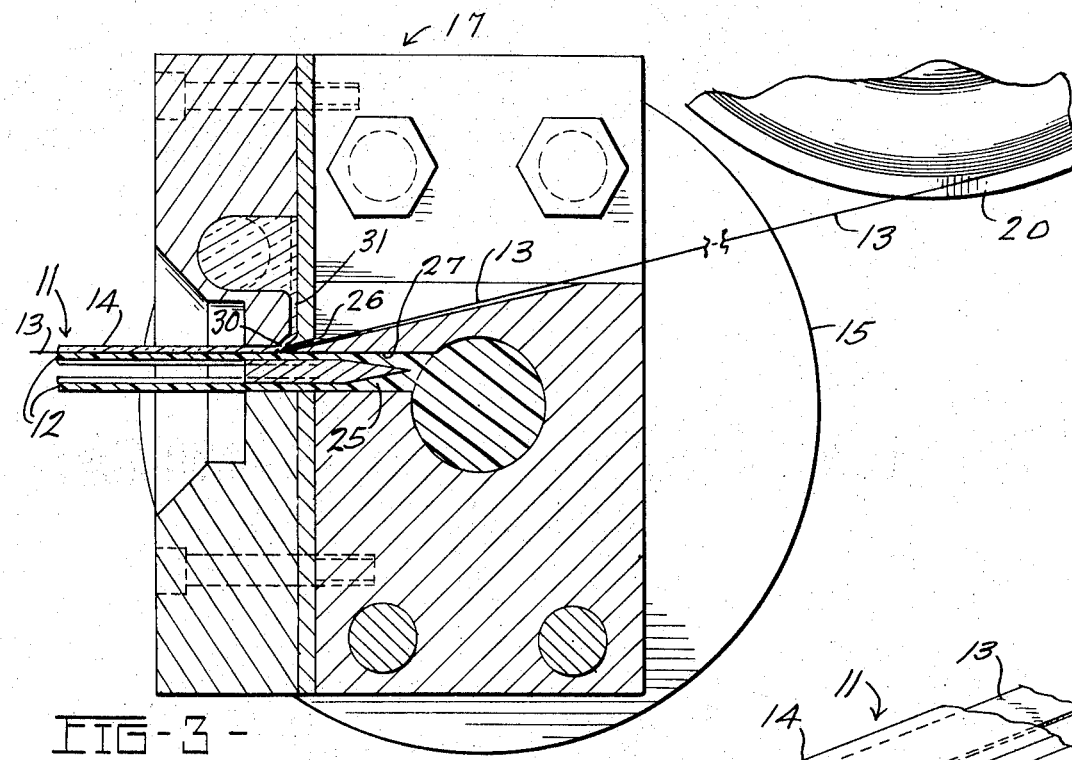
FIG-3-
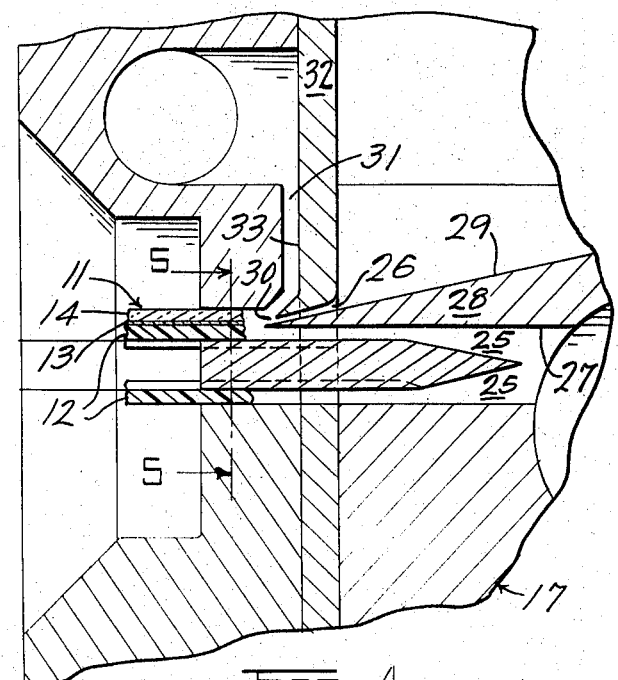
FIG-4-
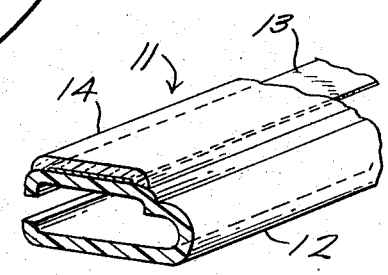
FIG-6-
FIG-5-

APPARATUS FOR PRODUCING TRIM STRIP ASSEMBLY

This is a division of application Ser. No. 127,168 filed March 23, 1971, now U.S. Pat. No. 3,780,152.

BACKGROUND OF THE INVENTION

The present invention relates to a trim strip assembly suitable for use on automobile exteriors, and to a process for producing such a trim strip.

For many years, the auto industry has made extensive use of metal trim strips to protect and enhance the exterior appearance of autos. Because of the cost of fabricating and attaching metal trim strips, auto manufacturers have attempted to substitute a composite plastic trim strip for such metal trim strips.

In general, prior art plastic trim strips have been produced by encapsulating a thin ribbon of metal foil within a transparent thermoplastic material. The transparent thermoplastic meterial exposes the metal foil to view, giving the plastic strip a metal-like appearance.

Problems have been encountered in producing an acceptable thermoplastic encapsulated metal foil. The metal foil is easily scratched during production. Scratches ruin the appearance of the trim strip, and contribute to a high reject rate.

The plastic material must be relatively inexpensive, and easy to fabricate. The plastic used must have the proper combination of torsional resistance and flexibility to enable the trim strip to conform easily to the auto surface to which it is attached without causing delamination of the metal foil strip.

SUMMARY OF THE INVENTION

The present invention provides a method and apparatus for producing a trim strip assembly. The trim strip assembly, according to the present invention, has a longitudinal thermoplastic base member, a superimposed strip, and a plastic top coating. The apparatus includes a die having three passageways for receiving the extruded base member, the superimposed strip and the plastic top coating.

Accordingly, an object of this invention is to provide an improved trim strip assembly.

A further object of this invention is to provide apparatus to produce a trim strip assembly in high volume production.

A still further object of this invention is to provide a trim strip assembly having a base member, a superimposed intermediate strip and a plastic top coating.

BRIEF DESCRIPTION OF THE DRAWINGS

FIG. 1 is a diagrammatic plan view of an apparatus for producing a trim strip assembly, including extruding means;

FIG. 2 is an enlarged cross-sectional view of the die, taken along line 2—2 of FIG. 1;

FIG. 3 is a cross-sectional view of the die, showing placement of the superimposed strip onto a longitudinal base member, taken along line 3—3 of FIG. 2;

FIG. 4 is an enlarged fragmentary view of the die of FIG. 3, showing the inner section of the passageways;

FIG. 5 is a fragmentary cross-sectional view taken along line 5—5 of FIG. 4; and FIG. 6 is a perspective view of a trim strip assembly, according to one form of the invention.

A DESCRIPTION OF THE PREFERRED EMBODIMENT

Preferred apparatus 10 shown in FIG. 1-5 is used to produce a trim strip assembly 11 shown in FIG. 6. Referring to FIG. 6, the trim strip assembly 11, has a thermoplastic base member 12, a superimposed strip 13 and a plastic top coating 14.

Referring to FIG. 1, the apparatus 10 includes a first conventional extruder 15 and a second conventional extruder 16, both operatively connected to a die 17. Plastic material is introduced into the first extruder 15 through an inlet 18 to form the thermoplastic base member 12, as subsequently explained in more detail. The die 17 preferably has heating means 19. A supply reel 20 carries the strip material 13. The strip material 13 is fed from the reel 20 to the die 17. The thin plastic top coating 14, as subsequently explained in more detail, is placed over the strip material 13 superimposed on the base member 12, thereby forming the strip assembly 11.

A pair of opposed driven rollers 21, pull the trim strip assembly 11 from the die 17. The trim strip assembly 11 is cooled as it leaves the die 17 by means of cooling-air jets 22 and a cooling tank 23. A cut-off means 24 is used to cut the trim strip assembly 11 into desired lengths.

Referring to FIGS. 3 and 4, the die 17 has a first passageway 25 through which the thermoplastic base member 12 is directed. The first passageway 25 intersects a second passageway 26, and extends to an outlet orifice. The first passageway 25 is partially bounded on one side by the lower surface 27 of a first divider 28. The second passageway 26 directs the superimposed strip 13 onto the thermoplastic base member 12. The second passageway 26 terminates at the apex 30 of the upper and lower surfaces 27 and 29 of the first divider 28. A third passageway 31 for directing the plastic top coating 14 onto the superimposed strip 13, intersects the second passageway 26 a short distance from the intersection of the first and second passageways 25 and 26. The third passageway 31 is partially defined by a second divider 32. One inner surface 33 of the divider 32 intersects the second passageway 26 at the termination of the third passageway 31. The intersection of the second and third passageways 26 and 31 is in a plane normal to both passageways.

Referring now to FIG. 2 and FIG. 3 thermoplastic material suitable for forming the base member 12 passes from the first extruder 15 into the first passageway 25 of the die 17. Thermoplasitc material suitable for formation of the base member 12 must have the proper combination of torsional resistance and flexibility. Plastics such as cellulose propionate, cellulose butyrate and cellulose acetate butyrate, either unmodified or conventionally modified by combination with plasticizers such as long-chain aliphatic esters, aromatic esters, aromatic and aliphatic phosphates, stabilizers and colorants, which are normally used for the top coating 14 may also be successfully used in base member formation, along with polyethylene and other thermoplastics which are not necessarily compatible with the top coat material. Depending upon the styling desired, the thermoplastic base member may be colored, transparent or opaque.

Referring to FIG. 3 and FIG. 4, a metal foil strip 13 is shown being directed along the second passageway 26.

The use of the metal foil strip 13 in conjunction with the transparent plastic coating 14, produces the trim strip assembly 11, which has a metal-like appearance. The superimposed strip 13 is not limited to a metal foil or metal strip, and may include thermoplastic compositions. Because metal, metal foil and thermoplastic strips are available in different colors and designs, with burnished or embossed surfaces, such strips may be color-coordinated to the automobile. A thermoplastic composition used as the superimposed strip 13, need not be compatible with the thermoplastic base member 12. Because of the design of the die passageways, the plastic top coating 14 helps to mechanically bond the superimposed strip 13 to the base member 12.

Referring now to FIG. 4, the intersection of third passageway 31 which directs the plastic top coating 14 onto the superimposed strip 13 is shown in greater detail. The plastic top coating 14 is directed onto the strip material 13 a distance less than 0.10 inch ahead of the location where the strip 13 is placed upon the base member 12. The forces resulting from the dynamic intersection of the base member 12 and the superimposed strip 13 tend to position the strip 13 against the top of the first passageway 25. If the strip 13 is metal, contact with the top surface of the passageway 25, may wrinkle or scratch the strip 13. However, if the top coating 14 is placed on the strip 13 before the strip 13 comes into contact with the base member 12, as is shown in FIG. 3 and described above, the strip 13 is protected against scratching and wrinkling. If a thermoplastic material is used as the strip 13, instead of metal or metal foil, scratching and wrinkling problems are lessened.

The plastic top coating 14 can be formed of a material dissimilar to the base member 12. Since the top coating 14 and the base member 12 are in a state of relative flux at the time of joining, the pressure and the heat used in forcing the trim assembly 11 through the die produces a thermal sealing or fusion between the two plastic materials. If the thermoplastic base member 12 and the plastic top coating 14 are not "compatible", i.e., in the sense that they are not capable of fusing together, the upper surface of the thermoplastic base member 12 may be formed with a key slot 34 as shown in FIG. 5. The plastic top coating 14 will flow into the key slot 34, forming a mechanical lock which will hold the superimposed strip 13 securely to the base member 12.

The plastic top coating 14 is formed of a suitable material that has good weather-resisting and wear-resisting qualities, and is formed as a thin film over the superimposed strip 13. Materials such as polyvinyl chloride and cellulose acetate propionate are satisfactory.

In operation, the thermoplastic base member 12 is formed by first extruder 15 and is moved along a first longitudinally extending, enclosed planar path partially bounded by the first passageway 25. The strip material 13 is fed from a supply reel 20, and is directed along a second longitudinally extending enclosed planar path bounded by the upper surface 29 of a first divider 28. The second path is in a plane which intersects the first path in a line such that the line of intersection is normal to the direction of movement of both paths. The plastic top coating 14 is moved along a third enclosed path partially bounded by a second divider 32. The plastic top coating 14 is directed onto the strip material 13 at a predetermined distance from the intersection of the strip 13 and the base member 12. The trim strip assembly 11 which includes the thermoplastic base member 12, the superimposed strip 13 and the plastic top coating 14, is directed through an orifice, pulled from the die 17, and cooled.

What I claim is:

1. Apparatus for forming a trim strip assembly including a longitudinal base member, a superimposed strip and a plastic top coating, said apparatus comprising, in combination, a die defining a first passageway for receiving a thermoplastic extruded base material, said first passageway extending so that said extruded base material moves in a planar path and having an outlet orifice of a desired configuration, said die defining a second passageway for receiving the strip, said second passageway intersecting said first passageway, said die defining a third passageway which intersects said second passageway at a point which is located a predetermined distance upstream from the intersection of said first and second passageways for contacting the strip and the plastic top coating entering from the third passageway before the base member is contacted by the strip, and said third passageway having an outlet orifice of another desired configuration oriented for laying a composite strip on said base material.

2. Apparatus according to claim 1, including first extruding means operatively connected to said first passageway for extruding the thermoplastic base material and for supplying such base material to said first passageway.

3. Apparatus according to claim 2, including second extruding means operatively connected to said third passageway for extruding the top coating and for supplying such coating to said thrid passageway.

4. Apparatus according to claim 3 including means for supplying said trip to said second passageway.

5. Apparatus according to claim 4 including means for cooling said trim strip assembly as it leaves said outlet orifice.

6. Apparatus according to claim 5, wherein said cooling means comprises a cooling tank containing a cooling liquid.

7. Apparatus according to claim 6, wherein said cooling means includes means for supplying cooling air to said trim strip assembly.

8. Apparatus according to claim 3 including means operatively connected to said trim strip assembly for removing such trim strip assembly from said die.

9. Apparatus according to claim 8 wherein such means comprise a pair of opposed rollers, at least one of such rollers being a drive roller.

10. Apparatus according to claim 3 including means operatively connected to said trim strip assembly for cutting such trim strip assembly into predetermined lengths.

11. Apparatus according to claim 3 including means for heating said die.

12. Apparatus according to claim 3 wherein said first passageway extends in a given direction to the outlet orifice, and is partially bounded on one side by the lower surface of a first divider.

13. Apparatus according to claim 12 wherein said second passageway is located between said main passageway and said third passageway, said second passageway being bounded by the upper surface of said first divider on the opposite side thereof from said main passageway and terminating at the apex of the upper and lower surface of said first divider.

14. Apparatus according to claim 13 wherein said third passageway is located above said second passageway, being partially bounded by a second divider one inner surface of which intersects the second passageway at the termination of the third passageway, said intersection being in a plane substantially normal to both passageways, and at a predetermined distance from the intersection of the upper and lower surface of said first divider.

15. Apparatus according to claim 14 wherein the predetermined distance is from 0.001 to 0.06 inch.

16. Apparatus according to claim 15 wherein the predetermined distance is about 0.015 inch.

* * * * *